US012363192B2

(12) United States Patent
Mano et al.

(10) Patent No.: US 12,363,192 B2
(45) Date of Patent: Jul. 15, 2025

(54) COMMUNICATION SYSTEM, COMPUTING MACHINE, COMMUNICATION METHOD AND PROGRAM

(71) Applicant: Nippon Telegraph and Telephone Corporation, Tokyo (JP)

(72) Inventors: Toru Mano, Musashino (JP); Junki Ichikawa, Musashino (JP); Yukio Tsukishima, Musashino (JP); Kenji Shimizu, Musashino (JP); Hideki Nishizawa, Musashino (JP); Tomoya Hibi, Musashino (JP); Kiwami Inoue, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/687,581

(22) PCT Filed: Sep. 6, 2021

(86) PCT No.: PCT/JP2021/032650
§ 371 (c)(1),
(2) Date: Feb. 28, 2024

(87) PCT Pub. No.: WO2023/032200
PCT Pub. Date: Mar. 9, 2023

(65) Prior Publication Data
US 2024/0357008 A1 Oct. 24, 2024

(51) Int. Cl.
*H04L 12/24* (2006.01)
*H04L 41/0803* (2022.01)
*H04L 67/1097* (2022.01)

(52) U.S. Cl.
CPC .............................. *H04L 67/1097* (2013.01)

(58) Field of Classification Search
CPC .......................... H04L 67/1097; H04B 10/80
(Continued)

(56) References Cited

U.S. PATENT DOCUMENTS

| 11,909,628 | B1 * | 2/2024 | Friedman | ............... H04L 45/24 |
| 2014/0270776 | A1 * | 9/2014 | Jinno | ................. H04J 14/0238 |
| | | | | 398/69 |

(Continued)

FOREIGN PATENT DOCUMENTS

| CN | 106953797 A | * | 7/2017 | ............. H04L 45/24 |
| WO | WO 2012147889 | | 11/2012 | |
| WO | WO-2012147889 A1 | * | 11/2012 | .......... H04J 14/0204 |
| WO | WO-2016187813 A1 | * | 12/2016 | ......... H04L 12/4633 |

OTHER PUBLICATIONS

Masahiko et al., "Photonic Transport Network Architecture and Control Management Technology," NTT Technical Journal, Oct. 2007, 20 pages (with machine translation).
(Continued)

*Primary Examiner* — Yves Dalencourt
*Assistant Examiner* — Elizabeth Kassa
(74) *Attorney, Agent, or Firm* — Fish & Richardson P.C.

(57) ABSTRACT

This communication system comprises a plurality of computers 1, 2 that each comprise: an optical transport path control unit 14 that adjusts the number of optical transport paths between the computer itself and a connection target computer and that sets the adjusted number of optical transport paths; a remote direct memory access (RDMA) communication unit 11 that, in accordance with the number of optical transport paths 4 announced from the optical transport path control unit 14, chunks data that is to be transferred to the connection target computer; and an RDMA control unit 16 that sets RDMA communication paths the number of which is the same as the number of the
(Continued)

optical transport paths 4 pursuant to an instruction from the RDMA communication unit 11.

5 Claims, 6 Drawing Sheets

(58) Field of Classification Search
USPC .......................................................... 709/212
See application file for complete search history.

(56) References Cited

U.S. PATENT DOCUMENTS

| | | | |
|---|---|---|---|
| 2015/0071635 A1* | 3/2015 | Naito | H04Q 11/0066 398/49 |
| 2018/0102978 A1* | 4/2018 | Shen | H04L 69/14 |
| 2020/0125529 A1* | 4/2020 | Byers | G06F 13/28 |
| 2020/0371700 A1* | 11/2020 | Stabrawa | G06F 3/0631 |

OTHER PUBLICATIONS

Recio et al., "A Remote Direct Memory Access Protocol Specification," Network Working Group, Request for Comments 5040, Oct. 2007, 66 pages.

Takefusa et al., "An Experiment of Co-allocating Computing and Lambda Path Resources on the Grid," Research Report of Information Processing Society of Japan, 2006-ARC-167 2006-HPC-105, 6 pages (English abstract only).

* cited by examiner

Fig. 3

| TRANSMISSION MODE | MODULATION METHOD | BAUD RATE | ERROR CORRECTION CODE TYPE | TRANSMISSION CAPACITY |
|---|---|---|---|---|
| MODE 1 | BPSK | 32GBaud | RS+LDPC | TRANSMISSION CAPACITY 50 G |
| MODE 2 | BPSK | 32GBaud | BCH+LDPC | TRANSMISSION CAPACITY 50 G |
| MODE 3 | BPSK | 64GBaud | RS+LDPC | TRANSMISSION CAPACITY 100 G |
| MODE 4 | BPSK | 64GBaud | BCH+LDPC | TRANSMISSION CAPACITY 100 G |
| MODE 5 | QPSK | 32GBaud | RS+LDPC | TRANSMISSION CAPACITY 100 G |
| MODE 6 | QPSK | 32GBaud | BCH+LDPC | TRANSMISSION CAPACITY 100 G |
| MODE 7 | QPSK | 64GBaud | RS+LDPC | TRANSMISSION CAPACITY 200 G |
| MODE 8 | QPSK | 64GBaud | BCH+LDPC | TRANSMISSION CAPACITY 200 G |
| MODE 9 | 8QAM | 32GBaud | RS+LDPC | TRANSMISSION CAPACITY 150 G |
| MODE 10 | 8QAM | 32GBaud | BCH+LDPC | TRANSMISSION CAPACITY 150 G |
| MODE 11 | 8QAM | 64GBaud | RS+LDPC | TRANSMISSION CAPACITY 300 G |
| MODE 12 | 8QAM | 64GBaud | BCH+LDPC | TRANSMISSION CAPACITY 300 G |
| MODE 13 | 16QAM | 32GBaud | RS+LDPC | TRANSMISSION CAPACITY 200 G |
| MODE 14 | 16QAM | 32GBaud | BCH+LDPC | TRANSMISSION CAPACITY 200 G |
| MODE 15 | 16QAM | 64GBaud | RS+LDPC | TRANSMISSION CAPACITY 400 G |
| MODE 16 | 16QAM | 64GBaud | BCH+LDPC | TRANSMISSION CAPACITY 400 G |
| MODE 17 | 32QAM | 32GBaud | RS+LDPC | TRANSMISSION CAPACITY 250 G |
| MODE 18 | 32QAM | 32GBaud | BCH+LDPC | TRANSMISSION CAPACITY 250 G |
| MODE 19 | 32QAM | 64GBaud | RS+LDPC | TRANSMISSION CAPACITY 500 G |
| MODE 20 | 32QAM | 64GBaud | BCH+LDPC | TRANSMISSION CAPACITY 500 G |
| MODE 21 | 64QAM | 32GBaud | RS+LDPC | TRANSMISSION CAPACITY 300 G |
| MODE 22 | 64QAM | 32GBaud | BCH+LDPC | TRANSMISSION CAPACITY 300 G |
| MODE 23 | 64QAM | 64GBaud | RS+LDPC | TRANSMISSION CAPACITY 600 G |
| MODE 24 | 64QAM | 64GBaud | BCH+LDPC | TRANSMISSION CAPACITY 600 G |

COMMUNICATION SYSTEM, COMPUTING MACHINE, COMMUNICATION METHOD AND PROGRAM

CROSS-REFERENCE TO RELATED APPLICATIONS

This application is a National Stage application under 35 U.S.C. § 371 of International Application No. PCT/JP2021/032650, having an International Filing Date of Sep. 6, 2021. The disclosure of the prior application is considered part of the disclosure of this application, and is incorporated by reference in its entirety into this application.

TECHNICAL FIELD

The present invention relates to a communication system, a computing machine, a communication method, and a program.

BACKGROUND ART

In data communication between computing machine systems having a relatively short communication distance therebetween in a data center or the like, a remote direct memory access (RDMA) technology is used in which data is transferred between computing machines by accessing a memory without using a CPU in order to increase a communication processing speed (Non Patent Literature 1). Since a computing machine is directly connected to an optical network via an optical waveguide, the influence of a signal loss at a relay node is eliminated, and therefore RDMA can be applied to long-distance data communication.

In optical communication, with the spread of 5G, a distributed control method and a centralized control method for dynamically setting or deleting an optical communication path in response to various communication requests generated between geographically dispersed computing machines have been studied (Non Patent Literatures 2 and 3).

CITATION LIST

Non Patent Literature

Non Patent Literature 1: IETF, "A Remote Direct Memory Access Protocol Specification", RFC5040, October 2007

Non Patent Literature 2: Atsuko TAKEFUSA, "An Experiment of Co-allocating Computing and Lambda Path Resources on the Grid", Research report of Information Processing Society of Japan 2006-ARC-167 2006-HPC-105

Non Patent Literature 3: Masahiko JINNO, "Photonic Transport Network Architecture and Control Management Technology", NTT Technical Journal, October 2007

SUMMARY OF INVENTION

Technical Problem

A technique has been proposed in which computing machines are connected via a plurality of optical transmission paths and data is transmitted in parallel in order to increase the communication capacity. In RDMA communication also in which data is transferred in a memory-to-memory manner, a technique for realizing data parallel transmission has been studied. A general communication protocol defines parallel transmission in the same layer or in the same protocol on the basis of the layer-independent principle.

However, when RDMA communication is set, it is difficult to recognize the number of optical transmission paths dynamically set in different layers, and it is difficult to automatically set the RDMA communication according to the number of optical transmission paths. Thus, in a case where a RDMA communication path is established in response to a request from a user, it takes time to enable RDMA communication.

The present invention has been made in view of the above circumstances, and an object of the present invention is to easily set RDMA communication according to the number of optical transmission paths.

Solution to Problem

In order to achieve the above object, one aspect of the present invention provides a communication system including a plurality of computing machines, in which the computing machines each include an optical transmission path control unit that adjusts the number of optical transmission paths with a computing machine that is a connection destination and sets the adjusted number of optical transmission paths, an RDMA communication unit that chunks data to be transferred to the computing machine that is a connection destination according to the number of optical transmission paths reported from the optical transmission path control unit, and an RDMA control unit that sets the same number of remote direct memory access (RDMA) communication paths as the number of the optical transmission paths according to an instruction from the RDMA communication unit.

Another aspect of the present invention provides a computing machine including: an optical transmission path control unit that adjusts the number of optical transmission paths with a computing machine that is a connection destination and sets the adjusted number of optical transmission paths; an RDMA communication unit that chunks data to be transferred to the computing machine that is a connection destination according to the number of optical transmission paths reported from the optical transmission path control unit; and an RDMA control unit that sets the same number of remote direct memory access (RDMA) communication paths as the number of the optical transmission paths according to an instruction from the RDMA communication unit.

Still another aspect of the present invention provides a communication method performed by a communication system including a plurality of computing machines, the communication method including: the computing machines each performing a step of adjusting the number of optical transmission paths with a computing machine that is a connection destination, setting the adjusted number of optical transmission paths, and reporting the set number of optical transmission paths; the computing machines each performing a step of chunking data to be transferred to the computing machine that is a connection destination according to the number of optical transmission paths reported in the reporting step; and the computing machines each performing a step of setting the same number of remote direct memory access (RDMA) communication paths as the number of the optical transmission paths.

Still further another aspect of the present invention provides a program for causing a computer to function as the computing machine.

Advantageous Effects of Invention

According to the present invention, it is possible to easily set RDMA communication according to the number of optical transmission paths.

BRIEF DESCRIPTION OF DRAWINGS

FIG. 3 is a diagram illustrating an example of a transmission mode table.

DESCRIPTION OF EMBODIMENTS

Figure 1:
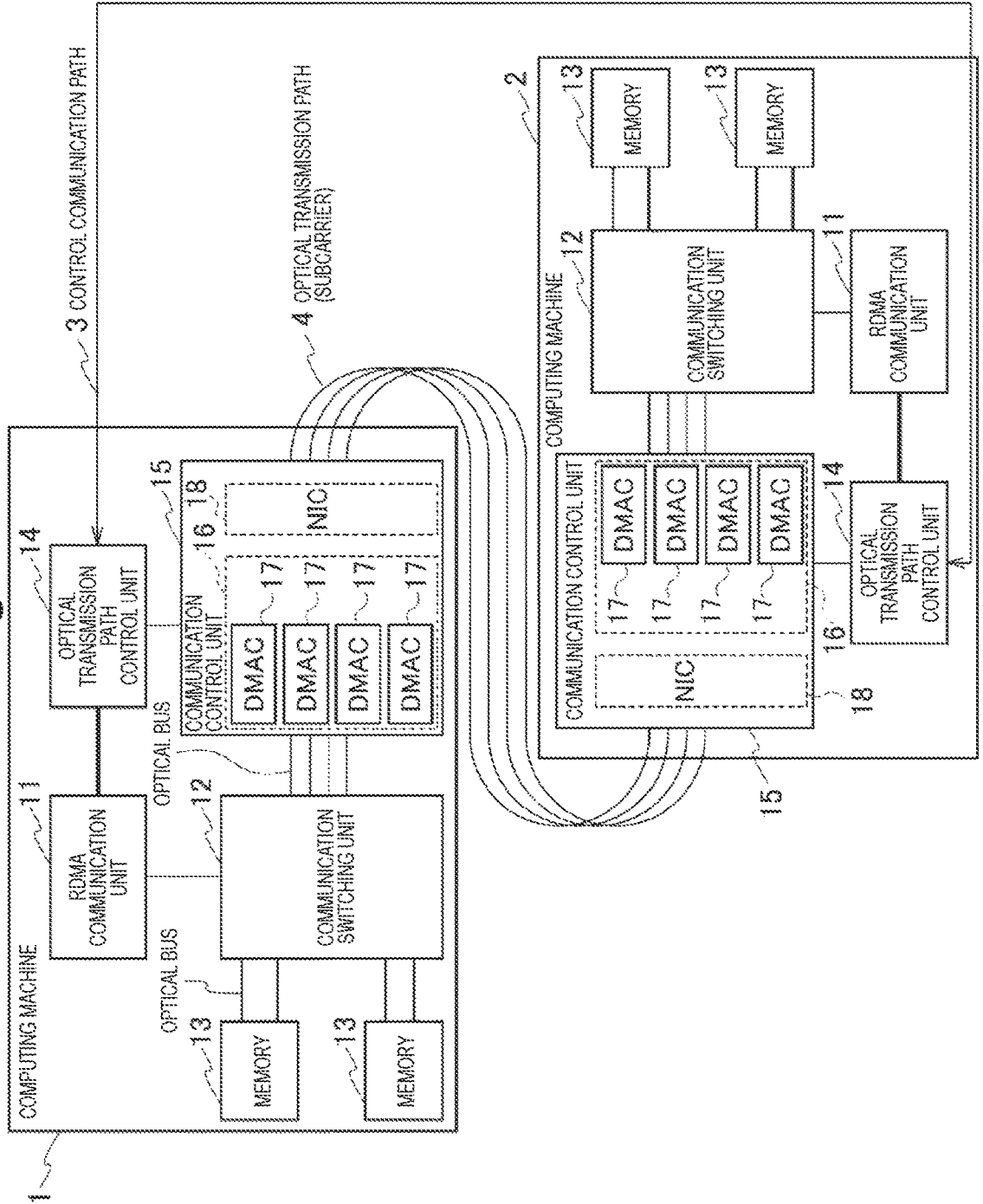
FIG. 1 is a configuration diagram of a communication system of an embodiment of the present invention.

Hereinafter, an embodiment of the present invention will be described with reference to the drawings.
Configuration of Communication System FIG. 1 is a system configuration diagram of a communication system according to an embodiment of the present invention. The communication system of the present embodiment includes a plurality of computing machines 1 and 2 connected to an optical network.

The optical network includes a control communication path 3 and an optical transmission path 4 (main signal communication path). The control communication path 3 is a communication path for transmitting a control signal. The optical transmission path 4 is a large-capacity and low-delay communication path of the layer 1 (lower layer), and is used to transmit a main signal. The communication system of the present embodiment is a communication system in which the computing machines 1 and 2 are connected via at least one optical transmission path 4 and data parallel transmission can be performed.

In the present embodiment, a subcarrier is used for the optical transmission path 4, but the present invention is not limited thereto. In the illustrated example, the computing machines 1 and 2 are connected by four subcarriers. The control communication path 3 is always set, and the optical transmission path 4 is dynamically set in response to a request from a user.

The computing machines 1 and 2 transfer data by means of remote direct memory access (RDMA) communication. The RDMA communication is communication for transferring data from a memory of one computing machine 1 to a memory of the other computing machine in a direct memory access (DAM) manner. In the RDMA communication, since data is transferred without passing through operating systems of the computing machines 1 and 2, it is possible to realize data transfer with high throughput and low latency.

In the present embodiment, as an upper layer with respect to the optical transmission path 4 (OTN protocol) of the layer 1, an RDMA communication path (RDMA protocol) is set on the optical transmission path 4 end-to-end to the computing machines 1 and 2. That is, the communication system of the present embodiment realizes RDMA over layer 1 transmission.

Each of the computing machines 1 and 2 includes an RDMA communication unit 11, a communication switching unit 12, a memory 13, an optical transmission path control unit 14, and a communication control unit 15. In the present embodiment, various devices such as the memory 13, the communication switching unit 12, and the communication control unit 15 in each of the computing machines 1 and 2 are connected via an optical bus by means of a photoelectric fusion technology, and these devices transmit and receive optical signals via the optical bus. The number of optical buses (the number of lanes) may be the same as the number of optical transmission paths 4.

As a result, a signal speed inside the computing machines 1 and 2 and a signal speed of the optical transmission path 4 may be made the same, and a communication layer inside the computing machines 1 and 2 and the communication layer of the optical transmission path 4 may also be made the same. Therefore, by equalizing the number of optical buses and the number of optical transmission paths 4 of the computing machines 1 and 2, it is not necessary to provide a buffer for adjusting a transmission/reception timing in the computing machines 1 and 2, and thus it is possible to realize high speed RDMA communication.

The RDMA communication unit 11 is an application for performing RDMA communication. The RDMA communication unit 11 is implemented by using a CPU and a memory. The RDMA communication unit 11 controls setting and deletion of an RDMA communication path. Specifically, the RDMA communication unit 11 chunks data to be transferred to the computing machine that is a connection destination according to the number of optical transmission paths 4 reported from the optical transmission path control unit 14. For example, the RDMA communication unit 11 may chunk data into the same number as the number of optical transmission paths 4. The RDMA communication unit 11 instructs the RDMA control unit 15 to set the same number of RDMA communication paths as the number of optical transmission paths 4 reported from the optical transmission path control unit 14.

The communication switching unit 12 is, for example, a Root Complex or a PCI switch, and switches communication destination devices of the RDMA communication unit 11. The memory 13 stores various types of data.

The optical transmission path control unit 14 controls setting and deletion of the optical transmission path 4. For example, the RDMA communication unit 11 of the computing machine 1 transmits setting information (control message) for setting the optical transmission path 4 to the computing machine 2 that is a connection destination via the control communication path 3 to set the optical transmission path 4. The optical transmission path control unit 14 of the present embodiment adjusts the number of optical transmission paths to be set with the computing machine 2 that is a connection destination, and sets the adjusted number of optical transmission paths. The optical transmission path control unit 14 notifies the RDMA control unit 15 of the set number of optical transmission paths 4. The optical transmission path control unit 14 includes a network interface card (NIC).

The communication control unit 15 includes an RDMA control unit 16 including a plurality of direct memory access (DMAC) 17, and an NIC 18. For example, a field programmable gate array network interface card (FPGA NIC) equipped with a laser may be used as the communication control unit 15. The DMAC 17 is implemented on the FPGA NIC. The DMAC 17 is a dedicated application (IC chip) that controls DMA transfer.

The RDMA control unit 16 controls data transfer by means of RDMA communication. The RDMA control unit 16 sets the same number of RDMA communication paths as the number of optical transmission paths 4 according to an instruction from the RDMA communication unit 11. The RDMA control unit 16 ensures a memory area for RDMA communication on the basis of an instruction from the RDMA communication unit 11, and transmits setting information including the memory area to the computing machine 2 that is a connection destination to set an RDMA communication path.

The network interface card (NIC) 18 is equipped with a laser (not illustrated) and transmits and receives a main signal flowing through the optical transmission path 4. The NIC 18 establishes the optical transmission path 4 on the basis of the setting information for the optical transmission path 4.

Communication Path Setting Process

Next, a process of setting the optical transmission path 4 and the RDMA communication path will be described. It is assumed that the control communication path 3 is set in advance. The process of setting the optical transmission path 4 and the RDMA communication path includes the following processes A, B, and C.

Process A: The computing machines 1 and 2 that perform RDMA communication transmit and receive control messages (a setting request and a setting response) for setting the optical transmission path 4 via the control communication path 3.

Process B: The computing machines 1 and 2 set the optical transmission path 4 on the basis of the control message.

Process C: The computing machines 1 and 2 transmit and receive the control messages (a setting request and a setting response) for setting the RDMA communication path, and set the RDMA communication path.

Figure 2:
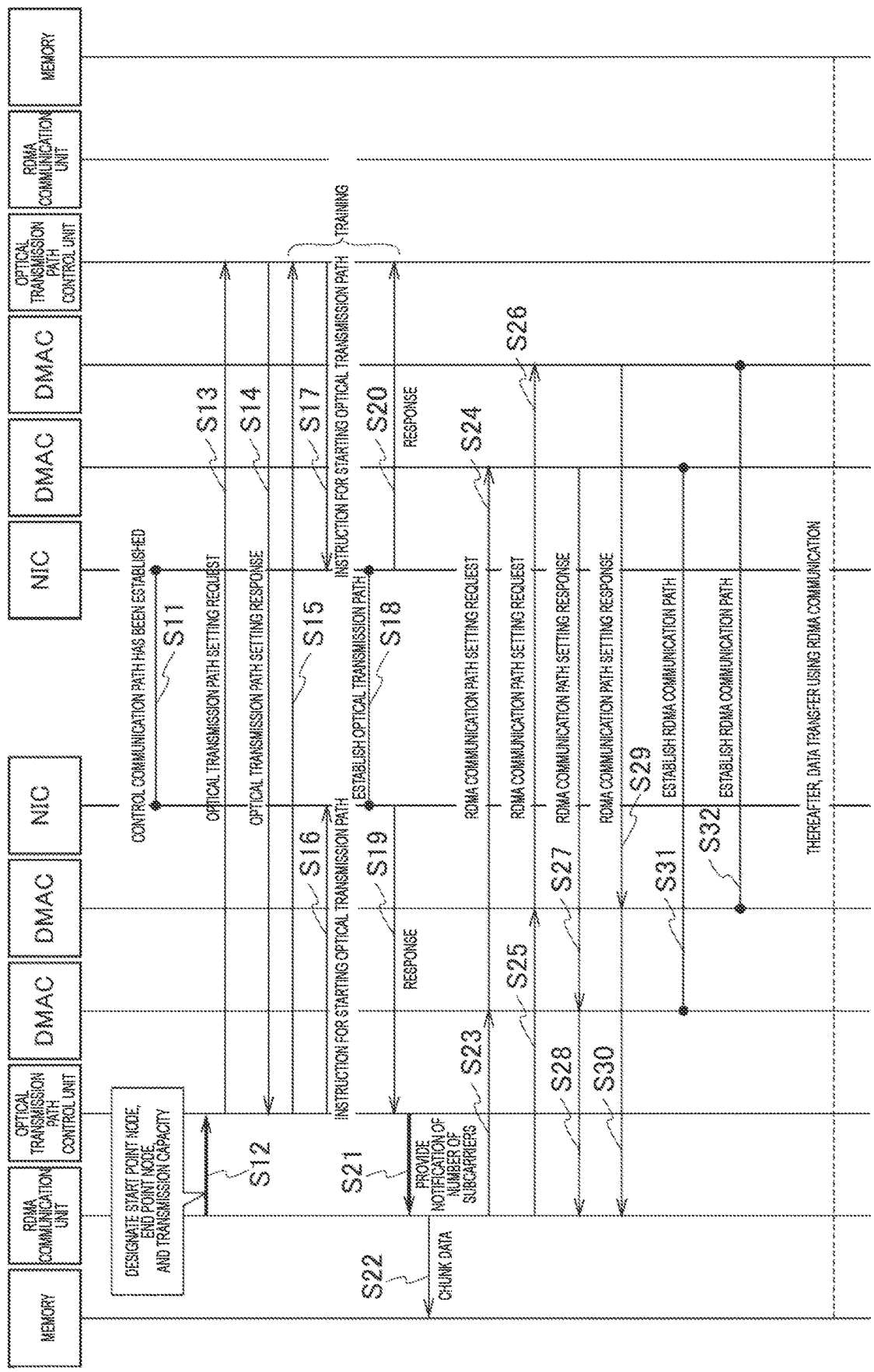
FIG. 2 is a sequence diagram illustrating a communication path setting process of the present embodiment.

FIG. 2 is a sequence diagram illustrating a communication path setting process of the present embodiment.

The process A is S12 to S14, the process B is S15 to S20, and the process C is S21 to S32. The control communication path 3 is established with the computing machines 1 and 2 in advance (S11).

The RDMA communication unit 11 of the computing machine 1 receives a request from a user and transmits a setting instruction for the optical transmission path 4 to the optical transmission path control unit 14 (S12). In the request of the user, a start point node of the computing machine 1 that is a connection source, an end point node of the computing machine 2 that is a connection destination, and a transmission capacity are designated.

The optical transmission path control unit 14 receives the setting instruction from the RDMA communication unit 11, and transmits, to the computing machine 2, a setting request (control message) including setting information for setting the optical transmission path 4 via the control communication path 3 (S13).

For the setting or deletion of the optical transmission path 4, centralized control such as software defined network (SDN) or network management system (NMS)/element management system (EMS) (Non Patent Literature 3) or distributed control such as generalized multi protocol label switching (GMPLS) (Non Patent Literature 2) may be used.

In a case where the centralized control of SDN is used, the setting information (setting request) transmitted from the computing machine 1 to the computing machine 2 via a centralized control server (not illustrated) includes a message identifier (session ID), a node identifier of a local end point of the optical transmission path 4, an interface/end point identifier as a local end point of the optical transmission path 4, a node identifier of a remote end point of a main signal communication path, a wavelength label identifier, a transmission capacity, and the like.

In a case where the distributed control of GMPLS is used, the setting information (setting request) transmitted by the computing machine 1 includes a message identifier (session ID), a node identifier of a local end point of the optical transmission path 4, a node identifier of a remote end point of the optical transmission path 4, an adjacent hop/end point identifier, a wavelength label identifier (possible group), a transmission capacity, and the like.

The optical transmission path control unit 14 of the computing machine 2 receives the setting request, and sets the optical transmission path 4 on the basis of the setting information included in the setting request. The optical transmission path control unit 14 of the computing machine 2 transmits, to the computing machine 1, a setting response (control message) including the setting information for the optical transmission path 4 via the control communication path 3 (S14). The optical transmission path control unit 14 of the computing machine 1 receives a setting response.

In a case where the centralized control of SDN is used, the setting information (setting response) transmitted to the computing machine 1 via the centralized control server includes a message identifier (session ID), a node identifier of a local end point of the optical transmission path 4, an interface/end point identifier as a local end point of the optical transmission path 4, a node identifier of a remote end point of the main signal communication path, a wavelength label identifier, a transmission capacity, and the like.

In a case where the distributed control of GMPLS is used, the setting information (setting response) transmitted by the computing machine 2 includes a message identifier (session ID), a node identifier of a local end point of the optical transmission path 4, a node identifier of a remote end point of the optical transmission path 4, an adjacent hop/end point identifier, a transmission capacity, an adjacent hop/end point identifier determined as the optical transmission path 4, a wavelength label identifier, and the like.

Next, the optical transmission path control unit 14 adjusts the number of optical transmission paths 4 (subcarriers) between the computing machines 1 and 2. That is, the optical transmission path control unit 14 automatically adjusts the number of optical signals transmitted in parallel between the computing machines 1 and 2.

Specifically, the optical transmission path control unit 14 of each of the computing machines 1 and 2 selects a transmission mode of the optical transmission path 4 by repeating the training in S15 to S20, and determines the number of necessary optical transmission paths 4 on the basis of a transmission capacity corresponding to the selected transmission mode.

FIG. 3 is a diagram illustrating an example of a transmission mode table. The transmission mode is a combination of a plurality of parameters (for example, a modulation method, a baud rate, and an error correction code type) related to transmission performance. The illustrated transmission mode table shows transmission mode information in which six types of modulation methods, two types of baud rates, and two types of error correction code types are combined. A transmission capacity corresponding to each transmission mode is also set in the transmission mode table.

The modulation methods include BPSK, QPSK, 8QAM, 16QAM, 32QAM, and 64QAM. The baud rates include 32GBaud and 64GBaud. The error correction code types include concatenation code FEC of RS-LDPC and concatenation code FEC of BCH-LDPC. Each of the computing machines 1 and 2 may store a transmission mode table in which a transmission mode in which transmission can be performed by its own device is set.

The optical transmission path control unit 14 of the computing machine 1 selects a transmission mode with the highest priority among transmission modes in which transmission can be performed by the own device. It is assumed that a priority is set to each transmission mode in advance. For example, a transmission mode including a modulation method with a higher multilevel degree and a higher baud rate may be set as a transmission mode with a higher priority. Specifically, in the case of the transmission mode table illustrated in FIG. 3, a priority of the transmission mode having a large transmission capacity (a multilevel degree is high and a baud rate is high) may be set to be high.

The optical transmission path control unit 14 of the computing machine 1 calculates the required number of optical transmission paths 4 (subcarriers) using the transmission capacity of the selected transmission mode and the transmission capacity requested in S14. For example, in a case where a transmission capacity in the selected transmission mode is 500 G and a requested transmission capacity is 2000 G, the optical transmission path control unit 14 sets the number of optical transmission paths 4 to four. The optical transmission path control unit 14 of the computing machine 1 transmits transmission mode information including each parameter of the selected transmission mode and the number of optical transmission paths 4 to the computing machine 2 that is a connection destination via the control communication path 3 (S15).

The optical transmission path control unit 14 of the computing machine 1 instructs the NIC 18 to start the designated number of optical transmission paths 4, on the basis of the transmission mode information (S16). Similarly, the optical transmission path control unit 14 of the computing machine 2 instructs the NIC 18 to start the designated number of optical transmission paths 4, on the basis of the received transmission mode information (S17). Each NIC 18 of the computing machines 1 and 2 attempts to start the optical transmission path 4, on the basis of the transmission mode information, the setting request, and the setting response (S14 and S15). In a case where each NIC 18 has successfully performed the starting, the optical transmission path 4 is established (S18).

Each NIC 18 of the computing machines 1 and 2 transmits a response to the starting instruction to the optical transmission path control unit 14 (S19 and S20). In a case where the starting succeeds, each NIC 18 transmits a response of the starting success to the optical transmission path control unit 14, and the optical transmission path control unit 14 proceeds to the next process (S21).

Meanwhile, if the starting fails, each NIC 18 transmits a response of the starting failure to the optical transmission path control unit 14, and the optical transmission path control unit 14 repeats the training in S15 to S20. That is, the optical transmission path control unit 14 of the computing machine 1 selects a transmission mode with the next highest priority among the transmission modes in which transmission can be performed by the own device, calculates the number of necessary control communication paths 3 by using a transmission capacity in the selected transmission mode and the transmission capacity requested in S14, and repeats the training in S15 to S20. The optical transmission path control unit 14 of the computing machine 1 repeats the training of S15 to S20 until the optical transmission path 4 is successfully activated.

Figure 4:
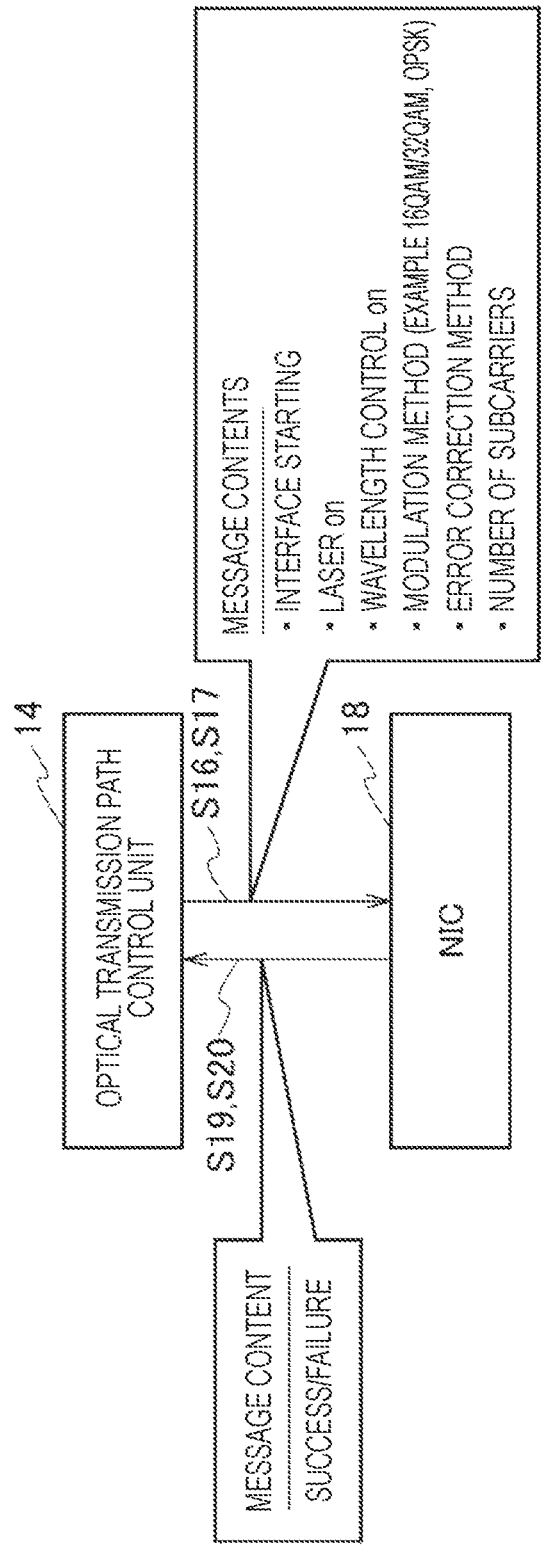
FIG. 4 is an explanatory diagram for explaining messages in S16 and S19 in FIG. 2.

FIG. 4 is an explanatory diagram for explaining messages between the optical transmission path control unit 14 and the NIC 18 in S16 and S19 (or S17 and S20) in FIG. 2.

The RDMA communication unit 11 transmits a message including the following items to the NIC 18 as a starting instruction in S16 and S17.

Interface starting
Laser on
Wavelength control on.
Modulation method (e.g.: 16QAM/32QAM or QPSK)
Error correction method (e.g.: Reed Solomon)
Number of subcarriers In a case of the instruction to stop the optical transmission path 4, the message includes "interface stop", "laser off", and "wavelength control off".

As a response in S19 and S20, the NIC 18 transmits, to the RDMA communication unit 11, a message indicating a processing result of whether starting of the number of optical transmission paths 4 for which the instruction is given has succeeded or failed.

Returning to FIG. 2, after receiving a response indicating that the starting of the optical transmission path 4 has succeeded, the optical transmission path control unit 14 of the computing machine 1 notifies the RDMA communication unit 11 of the set number of optical transmission paths 4 (S21). The RDMA communication unit 11 of the computing machine 1 receives the number of optical transmission paths 4 reported from the optical transmission path control unit 14, and chunks data in the memory 13 according to the number of optical transmission paths 4 (S22). That is, the data in the memory 13 is divided into a plurality of chunks (data sets) according to the number of optical transmission paths 4. In the present embodiment, the data in the memory 13 is divided into the same number of chunks as the number of optical transmission paths 4.

The RDMA communication unit 11 sets the same number of RDMA communication paths as the optical transmission paths 4. In the illustrated example, two RDMA communication paths are set. The RDMA communication unit 11 transmits an RDMA communication path setting instruction to each of the two DMACs 17 (S23 and S25). Each DMAC 17 performs setting such as ensuring a memory for RDMA, on the basis of the setting instruction, and transmits a setting request including setting information to the computing machine 2 that is a connection destination via the optical transmission path 4 (S24 and S26).

After receiving the setting request, each DMAC 17 of the computing machine 2 performs setting such as ensuring a memory for RDMA, on the basis of setting information included in the setting request, and transmits a setting response including the setting information to the computing machine 1 via the optical transmission path 4 (S27 and S29). As a result, the number of RDMA communication paths is set, the number being adjusted by the optical transmission path control unit 14 (S31 and S32).

Each DMAC 17 of the computing machine 1 transfers a setting response to the RDMA communication unit 11 (S28 and S30). The RDMA communication unit 11 allocates the chunked data to each RDMA communication path and starts RDMA communication.

Figure 5:
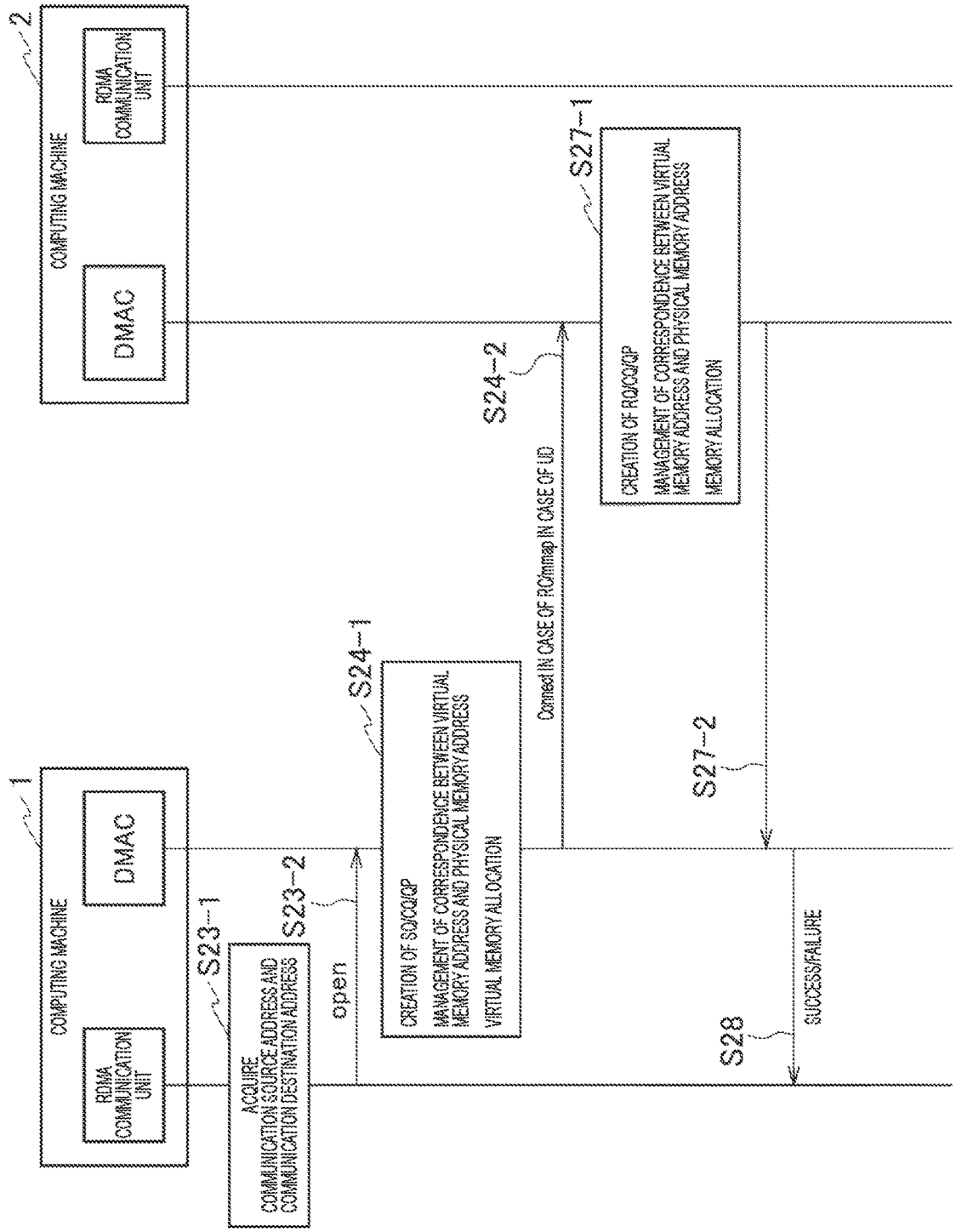
FIG. 5 is a sequence diagram illustrating details of S23, S24, S27, and S28 in FIG. 2.

FIG. 5 is a sequence diagram illustrating processes of the RDMA communication unit 11 and DMAC 17 in S23, S24, S27, and S28 in FIG. 2. Note that the processes in S25, S26, S29, and S20 in FIG. 2 are similar to those in FIG. 5.

The RDMA communication unit 11 of the computing machine 1 acquires a transmission source address and a transmission destination address (S23-1), and transmits a setting instruction for setting the RDMA communication path to the DMAC 17 (S23-2). The setting instruction (for example, "open") includes the following instruction.

Creation of SQ (Send Queue), CQ (Completion Queue), and QP (Queue Pair)

Association between virtual memory address and physical memory address

Memory allocation

The DMAC 17 performs setting such as ensuring a memory for RDMA according to the setting instruction (S24-1). The DMAC 17 transmits a setting request including setting information such as the ensured memory information to the computing machine 2 (S24-2). For the setting request, for example, "Connect" is used when the service type is RC (Reliable Connection), and "mmap" is used when the service type is UD (Unreliable Datagram).

After receiving the setting request, the DMAC 17 of the computing machine 2 performs setting such as ensuring a memory for RDMA according to the setting request (S27-1). Specifically, the DMAC 17 performs the following setting to start RDMA communication.

Creation of RQ (Receive Queue), CQ (Completion Queue), and QP (Queue Pair).

Association between virtual memory address and physical memory address

Memory allocation

The DMAC 17 transmits a setting response including setting information such as the ensured memory information to the computing machine 1 (S27-2). The DMAC 17 of the computing machine 1 receives the setting response, and notifies the RDMA communication unit 11 of the setting information included in the setting response (S28). The setting information also includes a status indicating whether the computing machine 2 has successfully set the RDMA communication path. Thus, the RDMA communication path is set.

Operation and Effect

The communication system of the present embodiment described above is a communication system including a plurality of computing machines 1 and 2, in which the computing machines 1 and 2 each include the optical transmission path control unit 14 that adjusts the number of optical transmission paths 4 with a computing machine that is a connection destination and sets the adjusted number of optical transmission paths 4, the RDMA communication unit 11 that chunks data to be transferred to the computing machine that is a connection destination according to the number of optical transmission paths 4 reported from the optical transmission path control unit 14, and the RDMA control unit 16 that sets the same number of RDMA communication paths as the number of optical transmission paths 4 according to an instruction from the RDMA communication unit 11.

In this way, in the present embodiment, the number of optical transmission paths 4 set by the optical transmission path control unit 14 is reported to the RDMA communication unit 11 by causing the optical transmission path control unit 14 and the RDMA communication unit 11 to cooperate with each other. As a result, in the present embodiment, RDMA communication according to the number of optical transmission paths 4 can be easily set. Specifically, the RDMA communication unit 11 can automatically chunk transfer target data on the basis of the reported number and perform RDMA transfer in units of chunks. Therefore, the time required to start the RDMA communication can be reduced.

In the present embodiment, the devices in the computing machines 1 and 2 are connected via an optical bus, and the RDMA communication unit 11 chunks data into the same number as the number of optical transmission paths 4. As a result, a signal speed inside the computing machines 1 and 2 and a signal speed of the optical transmission path 4 may be made the same, and a communication layer inside the computing machines 1 and 2 and the communication layer of the optical transmission path 4 may also be made the same. Thus, by equalizing the number of optical buses (the number of lanes) and the number of optical transmission paths 4 (the number of subcarriers) of the computing machines 1 and 2, it is not necessary to provide a buffer for adjusting a transmission/reception timing in the computing machines 1 and 2, and thus it is possible to realize high-speed RDMA communication.

Hardware Configuration

Figure 6:
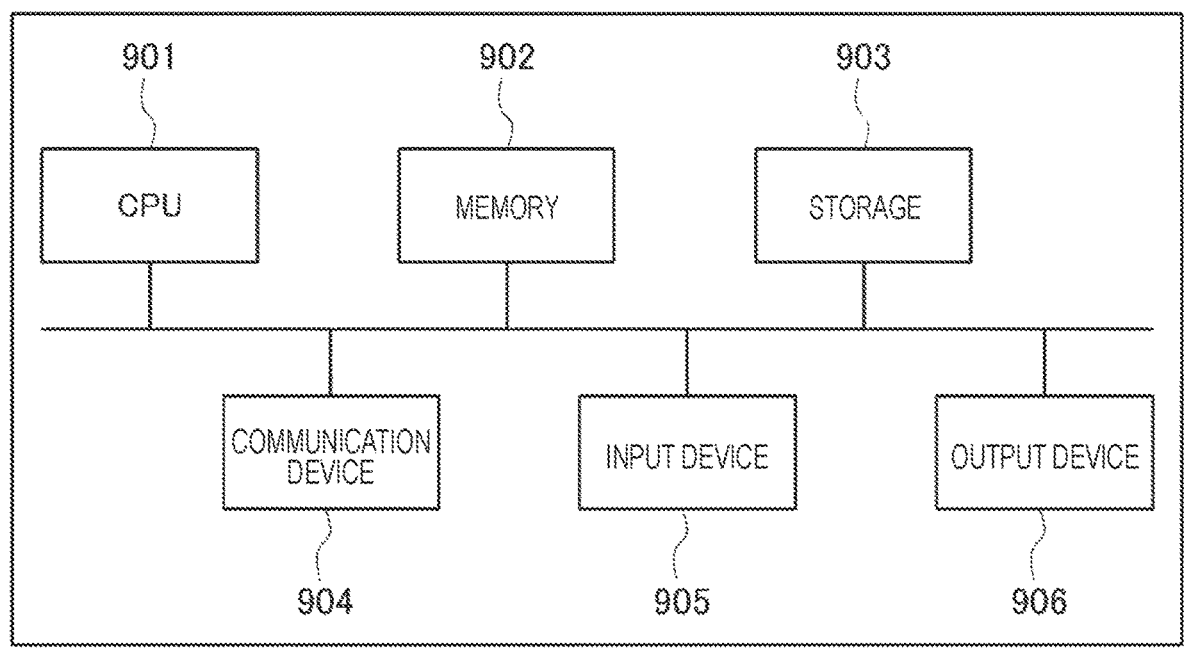
FIG. 6 is a diagram illustrating an example of a hardware configuration.

As the computing machines 1 and 2 described above, for example, a general-purpose computing machine system as illustrated in FIG. 6 can be used. The computing machine system illustrated in FIG. 6 includes a central processing unit (a CPU or a processor) 901, a memory 902, a storage 903 (a hard disk drive (HDD) or a solid state drive (SSD)), a communication device 904, an input device 905, and an output device 906. The memory 902 and the storage 903 are storage devices. In this computing machine system, the CPU 901 executes a predetermined program loaded to the memory 902, and thus the functions of the computing machines 1 and 2 are realized.

The computing machines 1 and 2 may be implemented by one computer or may be implemented by a plurality of computers. The computing machines 1 and 2 may be virtual machines mounted on a computer. A computing machine program may be stored in a computer-readable recording medium such as an HDD, an SSD, a universal serial bus (USB) memory, a compact disc (CD), or a digital versatile disc (DVD), or may be distributed via a network.

Note that the present invention is not limited to the above embodiment, and various modifications can be made within the scope of the spirit of the present invention. For example, in the above embodiment, the devices of the computing machines 1 and 2 are connected via the optical bus, but may be connected via an electrical bus (electrical signal). In this case, the RDMA communication unit 11 may perform RDMA communication by chunking data into a number m times (where m is an integer) the number of optical transmission paths and allocating data of m electrical buses to one optical transmission path 4 in consideration of a transmission speed of an electrical signal and an optical signal.

REFERENCE SIGNS LIST 1, 2 Computing machine
11 RDMA communication unit
12 Communication switching unit
13 Memory
14 Optical transmission path control unit
15 Communication control unit
16 RDMA control unit
17 DMAC
18 NIC 3 Control communication path
4 Optical transmission path (subcarrier)

The invention claimed is:

1. A communication system comprising: a plurality of computing machines, wherein
the computing machines each include
an optical transmission path control unit configured to adjust a number of optical transmission paths with a computing machine that is a connection destination and set the adjusted number of optical transmission paths,
a remote direct memory access (RDMA) communication unit configured to divide data to be transferred to the computing machine that is the connection destination into data chunks according to the number of optical transmission paths reported from the optical transmission path control unit, and transmit an instruction to set RDMA communication paths, wherein each data chunk corresponds to a different RDMA communication path, and
an RDMA control unit configured to set the same number of RDMA communication paths as the number of the optical transmission paths according to the instruction from the RDMA communication unit.

2. The communication system according to claim 1, wherein
devices in the computing machine are connected via an optical bus, and
a number of data chunks is the same as the number of optical transmission paths.

3. A computing machine comprising:
an optical transmission path control unit configured to adjust a number of optical transmission paths with a computing machine that is a connection destination and set the adjusted number of optical transmission paths;
a remote direct memory access (RDMA) communication unit configured to divide data to be transferred to the computing machine that is the connection destination into data chunks according to the number of optical transmission paths reported from the optical transmission path control unit, and transmit an instruction to set RDMA communication paths, wherein each data chunk corresponds to a different RDMA communication path; and
an RDMA control unit configured to set the same number of RDMA communication paths as the number of optical transmission paths according to the instruction from the RDMA communication unit.

4. A non-transitory computer-readable storage medium storing a program for causing a computer to function as the computing machine according to claim 3.

5. A communication method performed by a communication system comprising a plurality of computing machines,
wherein each computing machine performs operations comprising:
adjusting a number of optical transmission paths with a computing machine that is a connection destination, setting the adjusted number of optical transmission paths, and reporting the set number of optical transmission paths,
dividing data to be transferred to the computing machine that is the connection destination into data chunks according to the reported number of optical transmission paths, wherein each data chunk corresponds to a different remote direct memory access (RDMA) communication path, and
setting the same number of RDMA communication paths as the reported number of optical transmission paths.

* * * * *